United States Patent
David et al.

(10) Patent No.: US 9,681,493 B2
(45) Date of Patent: Jun. 13, 2017

(54) CONTROL SYSTEM

(75) Inventors: Vincent Paul René David, La Colle sur Loup (FR); Sébastien Claude Creiche, Le Cannet (FR); Arnault Jean Guy Fontebride, Roquefort les Pins (FR); Tristan Modeste Emile Bonhomme, Vallauris (FR)

(73) Assignee: Sophia Conseil, Valbonne, Sophia Antipolis (FR)

( * ) Notice: Subject to any disclaimer, the term of this patent is extended or adjusted under 35 U.S.C. 154(b) by 473 days.

(21) Appl. No.: 13/637,388

(22) PCT Filed: Mar. 30, 2011

(86) PCT No.: PCT/FR2011/050713
§ 371 (c)(1),
(2), (4) Date: Dec. 6, 2012

(87) PCT Pub. No.: WO2011/124828
PCT Pub. Date: Oct. 13, 2011

(65) Prior Publication Data
US 2013/0089004 A1 Apr. 11, 2013

(30) Foreign Application Priority Data
Mar. 30, 2010 (FR) ...................................... 10 01295

(51) Int. Cl.
*H04L 12/28* (2006.01)
*H04W 84/18* (2009.01)

(52) U.S. Cl.
CPC ........... *H04W 84/18* (2013.01); *H04L 12/282* (2013.01); *H04L 12/2816* (2013.01)

(58) Field of Classification Search
CPC .............................. H04W 24/00; G01D 21/00
USPC ........................................................ 340/856.3
See application file for complete search history.

(56) References Cited

U.S. PATENT DOCUMENTS

| 6,317,639 B1* | 11/2001 | Hansen ................. H04W 4/005 |
| | | 700/17 |
| 8,194,636 B1* | 6/2012 | Doherty et al. ............. 370/350 |
| 8,811,377 B1* | 8/2014 | Weston et al. .............. 370/351 |
| 2002/0009975 A1 | 1/2002 | Janusz et al. |
| 2006/0126617 A1* | 6/2006 | Cregg .................... H04B 3/542 |
| | | 370/389 |
| 2007/0052804 A1* | 3/2007 | Money et al. ................ 348/143 |

(Continued)

FOREIGN PATENT DOCUMENTS

WO WO-2007/044445 A2 4/2007

OTHER PUBLICATIONS

Avilés Martinez, M., "International Search Report" for PCT/FR2011/050713 as mailed Jul. 7, 2011, 3 pages.

*Primary Examiner* — Shaq Taha
(74) *Attorney, Agent, or Firm* — Winstead PC

(57) ABSTRACT

The present invention relates to a system for controlling a group of devices, comprising: —a network of nodes interconnected in a topology to form a meshed network, and —a coordinator making it possible to communicate with the nodes in the network, in which each device is connected to a node in the network, in which each node comprises: —a receiver making it possible to receive an instruction, —an instructor making it possible to transfer an instruction to the device connected to the node, and —a transmitter making it possible to transmit the instruction to a neighboring node.

15 Claims, 3 Drawing Sheets

(56) References Cited

U.S. PATENT DOCUMENTS

| | | | |
|---|---|---|---|
| 2007/0085699 A1 | 4/2007 | Walters et al. | |
| 2007/0100479 A1* | 5/2007 | Ahmed | G05B 15/02 700/47 |
| 2007/0195870 A1* | 8/2007 | Lewis | 375/219 |
| 2008/0064413 A1* | 3/2008 | Breed | B60C 11/24 455/456.1 |
| 2008/0088462 A1* | 4/2008 | Breed | 340/573.1 |
| 2009/0034259 A1* | 2/2009 | Laufer | G01S 7/003 362/253 |
| 2009/0059814 A1* | 3/2009 | Nixon et al. | 370/254 |
| 2009/0168796 A1* | 7/2009 | Pandey et al. | 370/458 |
| 2009/0168849 A1* | 7/2009 | Rouxel | 375/140 |
| 2009/0300379 A1* | 12/2009 | Mian | G01D 9/005 713/300 |
| 2009/0315699 A1* | 12/2009 | Satish et al. | 340/533 |
| 2010/0005331 A1* | 1/2010 | Somasundaram et al. | 713/340 |
| 2010/0156632 A1* | 6/2010 | Hyland | G08B 25/08 340/540 |
| 2010/0171430 A1* | 7/2010 | Seydoux | H05B 37/0272 315/159 |
| 2012/0297028 A1* | 11/2012 | Das | G01D 21/02 709/217 |
| 2013/0035901 A1* | 2/2013 | Breed | B60J 7/0573 702/188 |
| 2013/0088153 A1* | 4/2013 | Lagutko | H05B 37/0218 315/152 |
| 2013/0203376 A1* | 8/2013 | Maier et al. | 455/404.2 |

* cited by examiner

CONTROL SYSTEM

The invention relates to a system for control of a group of devices comprising a network of nodes interconnected in a topology in order to form a mesh network and a coordinator permitting communication with the nodes in the network.

STATE OF THE ART

In the field of computer technology, the different elements of a network can be interconnected in a plurality of different ways in order to allow communication between these elements. A specific topology for connecting the different elements of a network is the topology known by the name "MESH". The term "MESH" is an English term meaning mesh or net ("maille" or "filet" in French).

The "MESH" topology is a network topology describing networks which can be wired or wireless, within which all the hosts are connected in relay without a central hierarchy. By means of the "MESH" topology, a structure is created in the form of a net.

A major advantage of such a topology resides in the fact that this renders a network redundant. That means that in the case of a fault in one of the elements of the network, a sensitive point is avoided and the fault in said element does not cut the connection of one part of the network with another part of said network. If a network element is out of service, the adjacent elements are available to take up the relay and ensure that the connection between a given entry and a given exit is maintained.

The use of a "MESH" topology in a network has the advantage of very great flexibility in said topology to create the network. When the network is in place, this can easily be broadened. In theory, the quantity of nodes in a network is infinite.

Moreover, the "MESH" topology permits rapid and simplified deployment, permits great upgradability of coverage and offers, due to its mesh, high tolerance to faults and to interferences, which significantly reduces the costs of installing and exploiting these networks.

In the prior art, a network obtained by applying the "MESH" topology is called a "mesh network". The mesh networks which are known in the prior art are used to transmit a certain quantity of data from a first location to a second location. The different nodes which, together, form the network are placed at geographically separate places and the data are transmitted from an entry to a first node in the network. From this first node, the data are transmitted to a second node adjacent to the first node etc., to arrive in fine at their final destination.

As indicated above, if certain connections between certain nodes are no longer available, the data can follow an alternative path and the arrival of these data at their destination is assured.

In the document WO 2007/044445, a mesh network is disclosed which allows a series of devices to communicate with a general management element. In order to allow this communication, each device is provided with communication means able to communicate with a node forming part of a conventional network of nodes. One of the nodes of this mesh network has additional functionalities allowing it to receive and store information transmitted by the different nodes of the network to this specific node. This node, provided with additional functionalities, can transmit collected information to a central management element.

A first disadvantage of the system described in the document WO 2007/044445 resides in the fact that, in the case in which the node having additional functionalities no longer functions, all correspondence between the central management element and the devices present in the system becomes impossible.

The mesh network, disclosed in the document US 2007 0085699, is capable of receiving instructions and transmitting them to a network of lights connected to the mesh network.

The network described in the document US 2002 0009975 is used to communicate with a series of devices forming part of a system of public lights.

SUMMARY OF THE INVENTION

The aim of the present invention consists in using the flexibility and the redundancy of a network using the "MESH" topology in order to transmit instructions to a group of devices.

The object of the present invention relates, firstly, to a system for control of a group of devices comprising:
- a network of nodes interconnected in a topology to form a mesh network, in which each device is connected to a node in the network, in which each node comprises:
  - a receiver permitting reception of an instruction,
  - an instructor permitting transfer of an instruction to the device connected to the node, and
  - a transmitter permitting transmission of the instruction to an adjacent node, in which a coordinator permits communication with the nodes in the network.

A major advantage of the control system according to the invention resides in the fact that the control/activation of a large number of devices can be managed by transmitting an instruction to one of the nodes forming part of the network, said instruction then being transmitted from this first node to the adjacent node in order to ensure that all the different nodes forming part of the network receive said instruction.

In the text, the word "instructor" has been used to refer to a means permitting transfer of an instruction to the device connected to the node.

According to a preferred embodiment, the mesh network is based on wireless communication. The communication between the different nodes being effected wirelessly, the physical connection between the different nodes forming part of the network is not necessary. In other words, a large group of devices can be controlled by means of a coordinator without the devices themselves being linked to said coordinator.

The different nodes of the system can communicate with each other by any suitable means.

According to a preferred embodiment, the mesh network is based on wireless communication in the ISM band.

The use of wireless communication in the ISM band has several advantages. The ISM (Industrial, Scientific and Medical) bands are frequency bands which are not subject to national regulations and which can be used freely (gratis and without authorisation) for industrial, scientific and medical applications. In case of use of the ISM bands, the only requirements to be respected are emission power, frequency excursions and interference with adjacent frequencies. The typical fields of application are Bluetooth devices, wireless networks (Zigbee and Wlan), remote controls and domestic connections.

In a preferred embodiment, the nodes have the ability to transmit "return" data to the coordinator.

In a system for control (or management) of devices, it is very useful to be able to send not only instructions from a coordinator to the different nodes, in order to transmit said instructions in fine to the devices connected to the nodes, but also to receive the "returns" from the devices forming part of the system according to the invention via the nodes.

In the case in which, for example, one of the devices of the system no longer functions or functions incorrectly, it is important that this information be able to be transferred from a node connected to this device to the coordinator. After reception of this information, due to the use of the coordinator which transmits and/or processes said information, measures allowing troubleshooting or replacement of the defective device can be taken.

According to a preferred embodiment, at least one node is provided with a sensor permitting sensing of the information relating to the device connected to the node.

The presence of a sensor can assist in controlling the functioning mode of a device connected to a node. By means of this sensor, the information, for example relating to the ageing of the device connected to the node, can be recovered and transmitted to the coordinator. Thus, this sensor in particular permits recovery of information relating to malfunctioning of this device.

According to a preferred embodiment, at least one node is provided with a sensor permitting sensing of information relating to the environment in which said node is located.

Many advantages result from the use of a sensor for recovering data relating to the environment in which said sensor is placed. By way of example, it is possible to recover data relating to the direct influence of the environment on the device and the possible consequences for the functioning of this device.

Another example, the sensor used to recover information relating to the environment can also be used to cause the device to react to the specific circumstances of the place in which the node is situated.

In the case in which the device connected to the node is in the form of a lamp, the sensor makes it possible to control the luminosity of a specific place and light (or extinguish) the lamp according to the information recovered by means of said sensor.

According to a preferred embodiment, the system comprises a central management element connected to the coordinator of the network to control and coordinate the instructions sent to the nodes and to control and coordinate the "returns" received from the nodes in the network.

According to the invention, it is important to be able to control all of the instructions to be transmitted to the different nodes forming part of the network and to analyse the information transmitted by the nodes to the coordinator. In order to perform these functions, it is possible to connect the coordinator to a central management element which can be an electronic element, such as a computer or a processor or which can make possible a human interaction.

According to a preferred embodiment, the central management element is connected to the first coordinator of the first network and to the second coordinator of the second network, permitting control and coordination of the instructions transmitted to the node in the first network and in the second network, and permitting control and coordination of the "returns" received from the nodes in the first network and the second network.

According to a preferred embodiment, the connection between the central management element and the coordinator(s) is wired.

According to a preferred embodiment, the connection between the central management element and the coordinator(s) is wireless. In the case in which the connections between the central management element and the coordinator(s) is wireless, it is possible to obtain the connection by means of a protocol such as GPRS.

According to a preferred embodiment, the device is formed of a lamp.

The invention relates, secondly, to a node for the network of the system according to the invention.

The invention relates, thirdly, to a method permitting transmission of the instructions to a group of devices, in which the method comprises the following steps:
  connecting each device of the group to a node,
  interconnecting the nodes using a topology to create a mesh network,
  transmitting at least one instruction to a first node,
  transferring said at least one instruction from this first node to the device connected to this first node to allow the device to perform the action which corresponds to this instruction, and
  transmitting the instructions from this first node to an adjacent node in order to perform an action with the device connected to this adjacent node.

The invention also relates to a support which can be read by a computer comprising the instructions intended to perform the method according to the invention.

BRIEF DESCRIPTION OF THE DRAWINGS

The aim, the object and the characteristics of the present invention will become more clearly apparent on reading the following description given with reference to the drawings in which:

FIG. 1 shows a part of the system for control of a group of devices according to the invention. The control system according to FIG. 1 comprises a network 100 of nodes. In FIG. 1, four nodes are indicated under the reference numbers 101, 102, 103 and 104 and are interconnected by means of connections 110, 111, 112, 113, 114 and 115 to form a mesh network with the nodes 101, 102, 103 and 104. The mesh network thus obtained by means of the use of the connections 110 to 115 uses a redundant and flexible topology, ensuring that the communication between the different nodes 101 to 104 in the network 100 is maintained even if one or more of the connections 110 to 115 is no longer available.

Each node 101 to 104 is connected to a device indicated under the reference numbers 151, 152, 153 and 154. In FIG. 1, the devices 151 to 154 are in the form of lamps. It must be understood that the form of a lamp is used in order to illustrate the present invention without, in any way, limiting its scope. In fact, the devices 151 to 154 can be any other device such as presented above.

Figure 1:
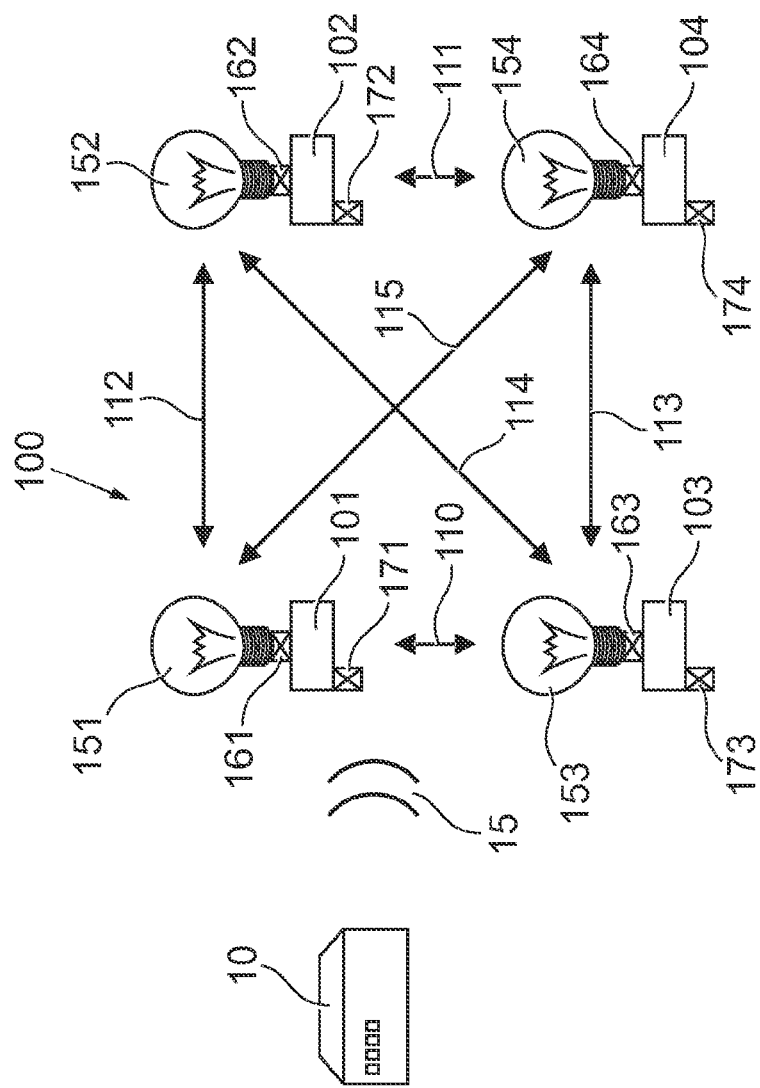
FIG. 1 shows a part of the system according to the invention with a coordinator, capable of communicating with a mesh network, comprising four nodes.

The nodes 101 to 104 are thus provided with sensors 161 to 164. Said sensors 161 to 164 are specifically suitable for recovering the information from the devices 151 to 154 to which they are connected. The nodes 101 to 104 are thus provided with sensors 171 to 174 permitting the recovery of the information pertinent and relative to the environment (to the place) in which the nodes 101 to 104 and the devices 151 to 154 linked to these nodes are situated.

The network 100 is connected by means of a connection, for example by means of a wireless connection indicated with the reference number 15, to a coordinator 10. Said coordinator 10 is suitable for transmitting instructions to the nodes 101 to 104 of the network 100.

The functionality of the system shown in FIG. 1 is as follows. The use of the coordinator 10 permits transmission of the instructions, for example, to the node 101. The instructions are then received by a receiver forming part of the node 101. The receiver is connected to an instructor which ensures that the instructions received by the node 101 are transferred to the device 151. Moreover, the instructions received by the receiver of the node 101 are transmitted, by means of a transmitter forming part of the node 101 to adjacent nodes 102, 103 and 104, using the connections 112, 115 and 110. In this manner, it is ensured that the instructions transmitted by the coordinator 10 to the node 101 are received by all of the nodes 101 to 104 forming part of the network 100.

The communication used to provide the different connections such as 15, 110-115, such as shown in FIG. 1, is based, for example on wireless communication in the ISM band. The ISM bands are specifically frequency bands not subject to national regulation and which can be used freely for industrial, scientific and medical applications. The frequencies to be used for the ISM vary depending on the countries.

The situation of the ISM bands is not uniformly regulated throughout the world. By way of example, in the United States, three ISM bands exist (902-928 MHz; 2400-2483.5 MHz and 5080 MHz). In Europe, one of the published frequency bands is among others 868 MHz. The only band which is free throughout the whole world is the 2.4 GHz band.

In the system according to FIG. 1, the nodes 101 to 104 are suitable for transmitting "return" data to the coordinator 10 by means of the same connections 15, 110-115.

These data, transmitted from the nodes 101 to 104 to the coordinator 10 can include specific information relative to the nodes 101 to 104 and to their functioning but also on the functioning of the devices 151 to 154 connected to the nodes 101 to 104.

The data transmitted by the nodes 101 to 104 to the coordinator 10 can thus include information obtained by means of the sensors 161 to 164 or 171 to 174.

Figure 2:
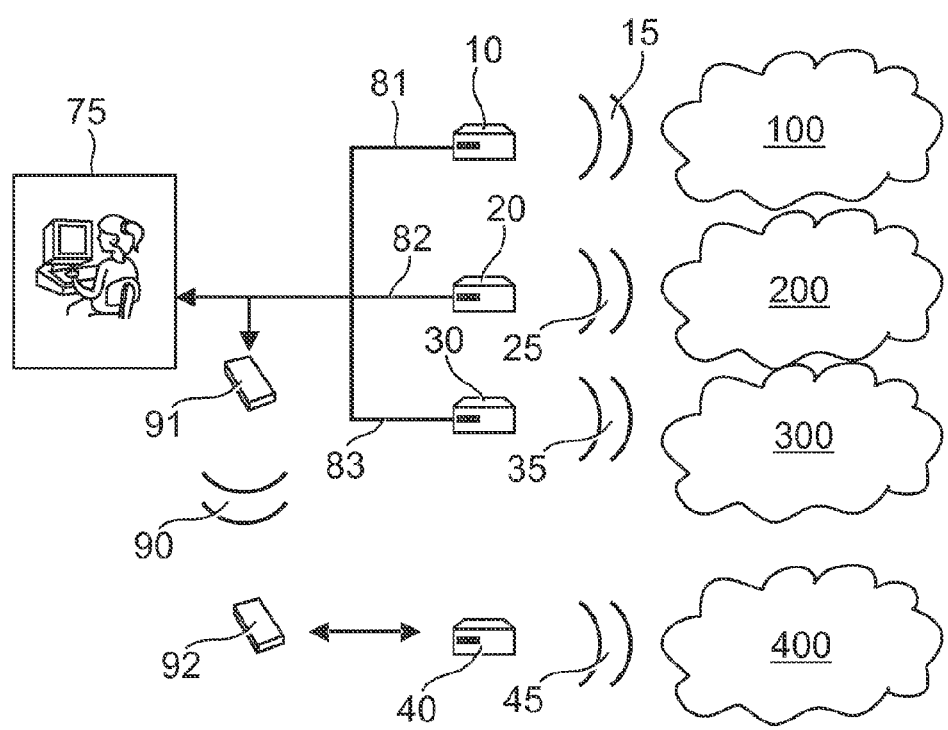
FIG. 2 shows, generally, the system according to the invention.

The system for control of a group of devices according to the invention is shown in FIG. 2, in which the part shown in FIG. 1 can again be seen as well as the other networks of nodes 200, 300 and 400.

The network 100 is connected by means of the connections 15 with the coordinator 10. The network 200 is, in similar manner, connected by means of the connections 25 to a coordinator 20. The networks 300 and 400 are connected by means of the connections 35, 45 with the coordinators 30, 40.

The different coordinators 10, 20, 30 and 40 are connected to a central management element 75. This central management element is the "System Manager" of the system such as shown in FIG. 2. The central management element 75 can be in the form either of a processor, such as a portable computer, or of a human operator or a combination of the two.

The central management element 75 is used to control and coordinate all of the instructions transmitted by the coordinators 10, 20, 30 and 40 to the different networks 100, 200, 300 and 400. Moreover, the central management element 75 is used to control and analyse all of the data transmitted by the different nodes of the networks 100, 200, 300 and 400 to the different coordinators 10, 20, 30 and 40.

Based on all of this information, the central management element 75 can be used to optimise the operation of the devices managed by means of the system shown in FIG. 2.

As indicated in FIG. 2, the coordinators 10, 20 and 30 are connected to the central management element 75 by means of wires 81, 82 and 83. The coordinator 40 is connected to the central management element 75 by means of a wireless connection 90 using devices including transmitters and receivers 91 and 92.

The connection between the coordinators and the central management element 75, obtained by wired connection by means of the connections 81, 82 and 83, can be any suitable types of connections such as Internet, ADSL, etc. The wireless connection 90 is, for example, a connection using a GPRS protocol.

A management system according to the invention is shown diagrammatically in FIG. 2. It must be understood that this system can be broadened in order to add new networks of nodes, each connected to the central management element 75.

In FIG. 1, reference is made to a network 100 including nodes 101 and 102 in which each of the nodes is connected to a device in the form of a lamp. In this form, the system for control of a group of devices can be used in order to control/manage the lighting and extinguishing of said lamps.

The control system according to the invention can be used to light a certain number of lamps situated in different places. The lighting and extinguishing instructions are transmitted by means of a coordinator and are then received by the different nodes using the connections present between the different nodes 101 to 104 in the network 100.

The "return" data transmitted by the node to the coordinator can include, for example, information relating to the ageing of the different lamps 151 to 154. Depending on the information relating to the ageing of these individual lamps 151 to 154, their replacement can be planned if that proves necessary.

In other words, the control system according to the invention offers the possibility of improving the maintenance of the network of lamps while limiting the costs associated with this maintenance and this while ensuring correct functioning of the network.

The different sensors 161 to 164, connected to the lamps 151 to 154, can be used to monitor, for example, whether the bulbs of the different lamps 151 to 154 are in an operating state or not. In this precise case, the information transmitted by the node involved can assist the person in charge of the maintenance of the lamps to make provision for the replacement of a specific lamp in the network.

It should be understood that the system as shown in FIGS. 1 and 2 can also be used for other applications in which the devices 151 to 154 are not lamps.

The system according to FIGS. 1 and 2 can, for example, be used in the management of automatic watering. In this precise case, the nodes 101 to 104 are connected to the watering device for which the management has been installed and is controlled by means of the system according to the invention.

In the case in which the system according to the invention is used for the management of automatic watering, the sensors 161 to 164 are used, for example, to monitor whether the different watering devices connected to the different nodes 101 to 104 are functioning correctly. In addition, the sensors 161 to 164 can transmit data containing information relating to the ageing of the different watering devices.

The sensors 171 to 174 can allow recovery of information relating to the environment in which the different nodes 101 to 104 are situated and the transfer of the information obtained to the coordinator 10. In this precise case, the sensors 171 to 174 can recover information relating to hydrometry and to local pollution around a node. They can also be passage detectors, thermometers or even sensors capable of assessing the intensity of the sunshine at the place in which the node is situated.

Another application of the system according to FIGS. 1 and 2 is, for example, the management of a public events display device.

Alternatively, the system according to FIGS. 1 and 2 can be used for the management of Christmas lights or those of events (exhibitions, etc.).

Alternatively, the system according to FIGS. 1 and 2 can be used to control road traffic; in this case, it permits indication of traffic jams or makes it possible to carry out the management of traffic lights.

Figure 3:
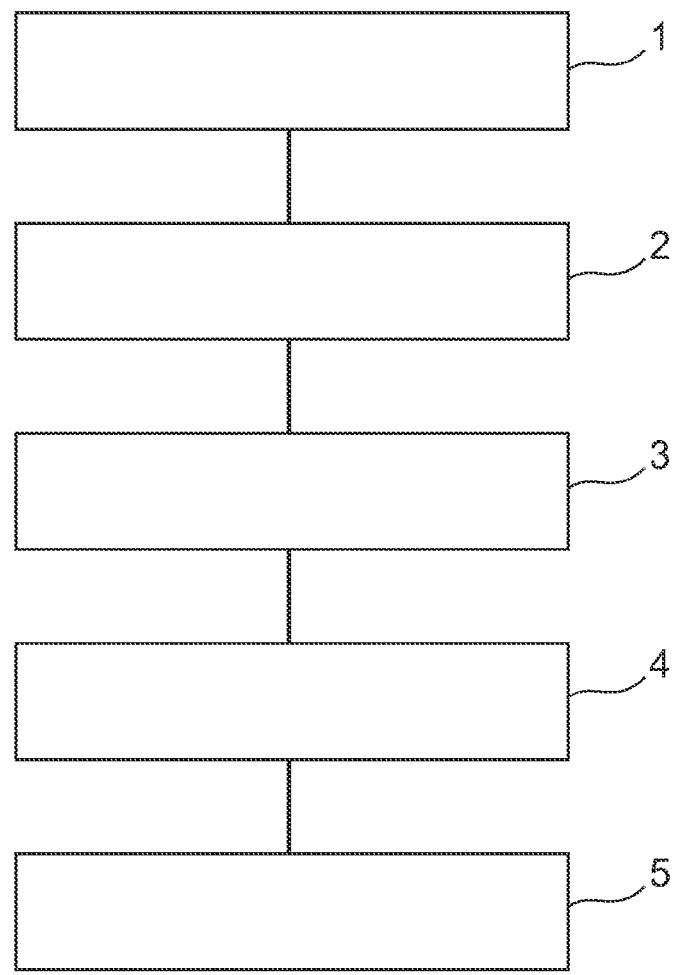
FIG. 3 shows, diagrammatically, the different steps of the method according to the invention.

A method according to the invention is shown, diagrammatically, in FIG. 3. According to FIG. 3, in a first step 1, the devices are each connected to a node.

In a second step, the different nodes are interconnected according to a topology permitting the creation of a mesh network.

In a third step, an instruction is transmitted to a first node.

In a fourth step, the instruction received by the first node is transferred to the device connected to this node to perform an action.

In a fifth step, the instruction received by the first node is transferred to an adjacent node in order to allow said adjacent node to perform an action with the devices connected to this adjacent node.

It should be noted that the system according to the invention, as shown in FIGS. 1, 2 and 3 presents several advantages. If the system is used to, for example, control a group of lamps, the management of the lighting and extinguishing of the lamps can be controlled by means of the system according to the invention. Similarly, the ageing of the different lamps within the system can also be monitored in order to improve the maintenance of a network of lamps.

Moreover, it is possible to ensure uninterrupted maintenance of the principal function of the network. In addition, the reliability of the system according to the invention is of the utmost importance. In the case in which one of the coordinators 10, 20, 30, 40, as shown in FIG. 2 is faulty, it is possible to redirect the nodes connected to this coordinator to an alternative coordinator.

According to the invention it is possible to ensure transmission of "bidirectional", high-performance, reliable and secure data. This "bidirectional" transmission is possible while minimising "broadcast", "multicast" and "unicast" transmissions.

This means that, in the case of "broadcast" transmission, the message sent is intended for all of the nodes present within the network. In the case of "multicast" transmission, the message sent is intended for a group of nodes present within the network. Lastly, in the case of "unicast" transmission, the message sent is intended for a single node. The system according to the invention can use different existing transmission modes.

The use of the system according to the invention has several other advantages. Firstly, a very small amount of daily transmission may be found. This results in minimal electromagnetic pollution. That means that the electromagnetic pollution generated for each message is very limited.

Another major advantage of the system according to the invention resides in the fact that a wired control network between the different nodes is not necessary. This represents a very large saving in terms of cost.

Regarding the size of the system, it should be noted that there is no theoretical limitation to the number of nodes nor any electrical network topology restriction. The different nodes used in one of the networks can be connected to a different electrical network. In the case in which different operators are used to provide the electricity to different elements of the device according to the invention, this causes no problem in the management of the network as a whole.

As has been already indicated above, the system according to the invention offers unlimited flexibility as well as a possibility of automatic reconfiguration of the network.

The invention claimed is:

1. A system for control of a group of lamps, comprising:
a network of nodes interconnected in a topology to form a mesh network, in which each lamp is connected to a node in the network of nodes, and in which each node of the network of nodes comprises:
a receiver permitting reception of an instruction;
an instructor permitting transfer of an instruction to a lamp connected to the node; and
a transmitter permitting transmission of the instruction to an adjacent node to allow said adjacent node to perform an action with the lamp connected to the adjacent node;
a coordinator permitting transmission of an instruction and reception of said instruction by all of the nodes of the network; and
wherein at least one node is provided with a sensor permitting sensing of information relating to an environment in which the sensor-provided node is located to cause the lamp connected to the sensor-provided node to react to the information relating to the environment in which the sensor-provided node is situated and wherein the sensor recovers data relating to direct influence of the environment on the lamps.

2. The system according to claim 1, wherein the mesh network is based on wireless communication.

3. The system according to claim 2, wherein the mesh network is based on wireless communication in the Industrial, Scientific, and Medical (ISM) band.

4. The system according to claim 1, wherein the nodes have capacity to transmit "return" data to the coordinator.

5. The system according to claim 4, wherein at least one node is provided with a sensor permitting sensing of information relating to the lamp connected to the node.

6. The system according to claim 1, wherein the system comprises a central management element connected to the coordinator of the network of nodes to control and coordinate the instructions sent to the nodes and to control and coordinate "returns" received from the nodes in the network.

7. The system according to claim 6, wherein the central management element is connected to a first coordinator of a first network and to a second coordinator of a second network, permitting control and coordination of the instructions transmitted to the nodes in the first network and in the second network, and permitting control and coordination of the "returns" received from the nodes in the first network and the second network.

8. The system according to claim 6, wherein a connection between the central management element and the coordinator(s) is wired.

9. The system according to claim 6, wherein a connection between the central management element and the coordinator(s) is wireless.

10. The system according to claim 9, wherein the connection between the central management element and the coordinator(s) is based on General Packet Radio Service (GRPS) communication.

11. The system according to claim 1, wherein the lamp is formed of a lamp.

12. A node suitable for the network of nodes of the system according to claim 1.

13. A method for transmitting instructions to a group of lamps, said method comprising:
   connecting each lamp of the group of lamps to a node;
   interconnecting the nodes using a topology to create a mesh network;
   sensing, by at least one node, of information relating to an environment in which the node is located, to cause a lamp connected to the node to react to the information relating to the environment in which the node is situated;
   recovering, by the at least one node, data relating to direct influence of the environment on the lamp;
   transmitting at least one instruction to a first node;
   transmitting said at least one instruction from this first node to the lamp connected to this first node to allow the lamp to perform an action which corresponds to this instruction; and
   transmitting said instruction from this first node to an adjacent node in order to perform an action with the lamp connected to this adjacent node.

14. The system according to claim 1, wherein the information relating to the environment includes at least one of a luminosity of the environment, a presence of an object in the environment, a location of an object in the environment, and functioning of each lamp of the group of lamps.

15. The method according to claim 13, wherein the information relating to the environment includes at least one of a luminosity of the environment, a presence of an object in the environment, a location of an object in the environment, and functioning of each lamp of the group of lamps.

* * * * *